US006873964B1

(12) United States Patent
Williams et al.

(10) Patent No.: US 6,873,964 B1
(45) Date of Patent: Mar. 29, 2005

(54) METHOD AND SYSTEM FOR RECRUITING PERSONNEL

(75) Inventors: Karl Williams, Arlington, VA (US); Jeff Ward, Centerville, VA (US); Lloyd Parker, Sterling, VA (US); Winston Watt, Warrenton, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 780 days.

(21) Appl. No.: 09/209,211

(22) Filed: Dec. 11, 1998

(51) Int. Cl.[7] ............................................. G06F 17/60
(52) U.S. Cl. ..................... 705/9; 705/8; 705/7; 705/11; 705/1; 705/500
(58) Field of Search ............................ 705/7, 8, 9, 11, 705/1, 500

(56) References Cited

U.S. PATENT DOCUMENTS

| | | | | |
|---|---|---|---|---|
| 5,117,353 A | * | 5/1992 | Stipanovich et al. | 705/11 |
| 5,164,897 A | * | 11/1992 | Clark et al. | 705/1 |
| 5,283,731 A | * | 2/1994 | Lalonde et al. | 705/1 |
| 5,416,694 A | * | 5/1995 | Parrish et al. | 705/8 |

FOREIGN PATENT DOCUMENTS

JP          2003030307 A  *  1/2003  ........... G06F/17/60

OTHER PUBLICATIONS

Montgomery, James D. "Equilibrium wage dispersion and interindustry wage differentials", Quarterly Journal of Business and Economics, v106, n1, p163 (17).*

* cited by examiner

Primary Examiner—Tariq R. Hafiz
Assistant Examiner—Akiba Robinson-Boyce
(74) Attorney, Agent, or Firm—Duane Morris LLP

(57) ABSTRACT

A method for recruiting personnel for a business entity including a plurality of distinct business units each having individual hiring requirements, wherein at least some of the distinct business units' hiring requirements compete for common applicants, the method including the steps of: entering information related to a plurality of hiring needs, each of the plurality of hiring needs being respectively associated with one of the plurality of distinct business units, and information related to a plurality of candidates into a database, respectively; automatically cross-referencing the information related to the plurality of hiring needs with the information related to the plurality of candidates to identify candidates selected the plurality of candidates who satisfy entered information indicative of hiring needs; and, determining which of the identified candidates should be offered a job associated with the hiring needs; wherein, when it is determined that one of the identified candidates should be offered more than one job as determined by the hiring needs, all jobs pertinent to the one of the associated candidates are offered substantially simultaneously to the one of the identified candidates.

20 Claims, 13 Drawing Sheets

METHOD AND SYSTEM FOR RECRUITING PERSONNEL

FIELD OF INVENTION

The present invention relates to personnel recruitment for a business entity and more particularly to a regionalized, automated, computerized method and system for the same.

BACKGROUND OF INVENTION

As is well known, the overall success of a company, or business entity, often revolves closely around its ability to effectively staff its programs with qualified personnel. Given recent increases in demand for technically skilled employees, for example Information Systems (IS) skilled individuals, by many competing companies coupled with flat projections of degreed graduates has resulted in fierce competition for top candidates.

To exacerbate this situation, as companies continue to grow and develop multiple divisions, or independent business units, these independent business units compete against each other for common candidates thus further driving the cost of new hires even higher.

Accordingly, there is a need for a recruiting method and system to implement it which allows for simultaneous filling of multiple positional vacancies by multiple qualified candidates without unnecessarily competing for those candidates.

SUMMARY OF INVENTION

A method for recruiting personnel for a business entity including a plurality of distinct business units each having individual hiring requirements, wherein at least some of the distinct business units' hiring requirements compete for common applicants, the method including the steps of: entering information related to a plurality of hiring needs, each of the plurality of hiring needs being respectively associated with one of the plurality of distinct business units, and information related to a plurality of candidates into a database, respectively; automatically cross-referencing the information related to the plurality of hiring needs with the information relaxed to the plurality of candidates to identify candidates selected the plurality of candidates who satisfy entered information indicative of hiring needs; and, determining which of the identified candidates should be offered a job associated with the hiring needs; wherein, when it is determined that one of the identified candidates should be offered more than one job as determined by the hiring needs, all jobs pertinent to the one of the associated candidates are offered substantially simultaneously to the one of the identified candidates.

DETAILED DESCRIPTION OF THE INVENTION

By adopting the approach of the present invention a business entity can reduce the overall expenditures associated with recruiting efforts by: coordinating efforts, combining resources dealing with advertising budgets, job fairs, recruiters, employment of new information technology and centralizing the recruiting effort. However, one should realize that such an approach is not merely the centralization of the recruiting function as many of the critical stages of recruitment will remain decentralized and within the control of managers.

Figure 1:
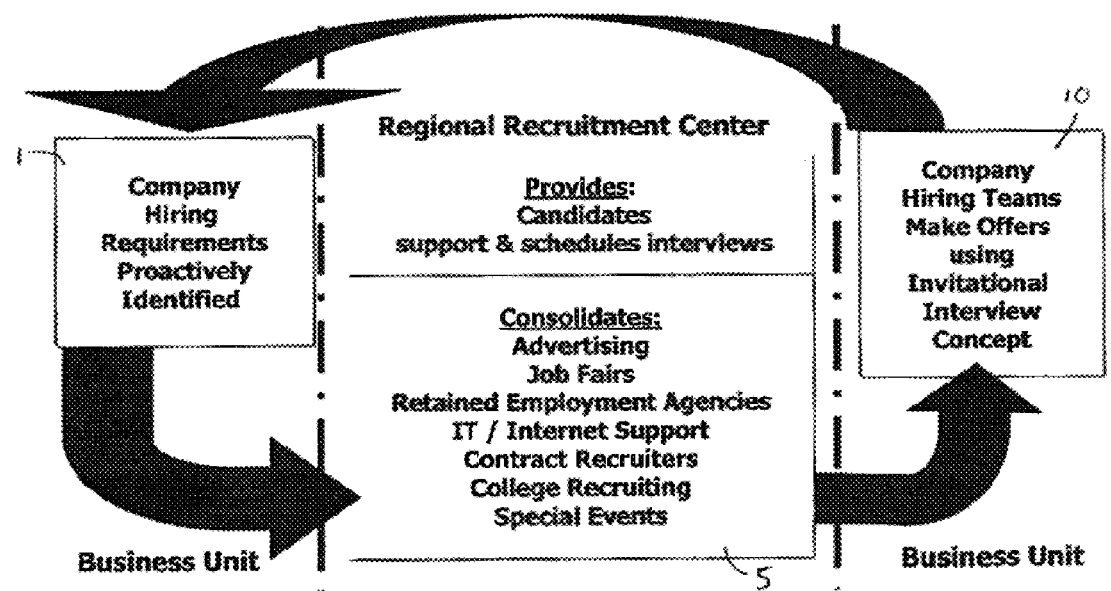
FIG. 1 illustrates an overview of the method according to the present invention.

Referring now to the several figures, wherein like references refer to like elements of the invention FIG. 1 illustrates the underlying concept of the present invention. By providing company hiring needs 1 to a regional recruiting center (RRC) 5 according to the present invention, company hiring teams can make offers using an invitational interview concept. The RRC 5 preferably provides consolidated resources associated with advertising, job fairs, employment agencies, IT/Internet support, contract recruiters, college recruiting and special recruiting events.

Generally, technical recruiters associated with the RRC down select the candidate pool and invite candidates to interview. Business unit (division for example) hiring managers interview these candidates at the RRC on predetermined days for example. Preferably, each day focuses on a particular skill set. The RRC director then coordinates collaborative roundtable sessions associated with each independent business unit's needs and the candidates who have interviewed. Pursuant to this session, select candidates will be offered one salary with one or more business units.

The advantages to such an approach include that the RRC acts essentially as a forcing function, thus shortening cycle time from hiring need recognition to actual hiring of an employee. Further, the controlled integrative environment should provide each candidate with a more positive impression of the company as a whole (including each independent business unit) thus making it a more attractive employer to the candidates.

Further advantages to be realized include reducing the number of interview hours required of hiring managers, increasing the acceptance ratio by utilizing coordinated offers, hand-selected hiring managers and better focused recruiters, and an increased employee quality by using a centralized gatekeeper.

Figure 2:
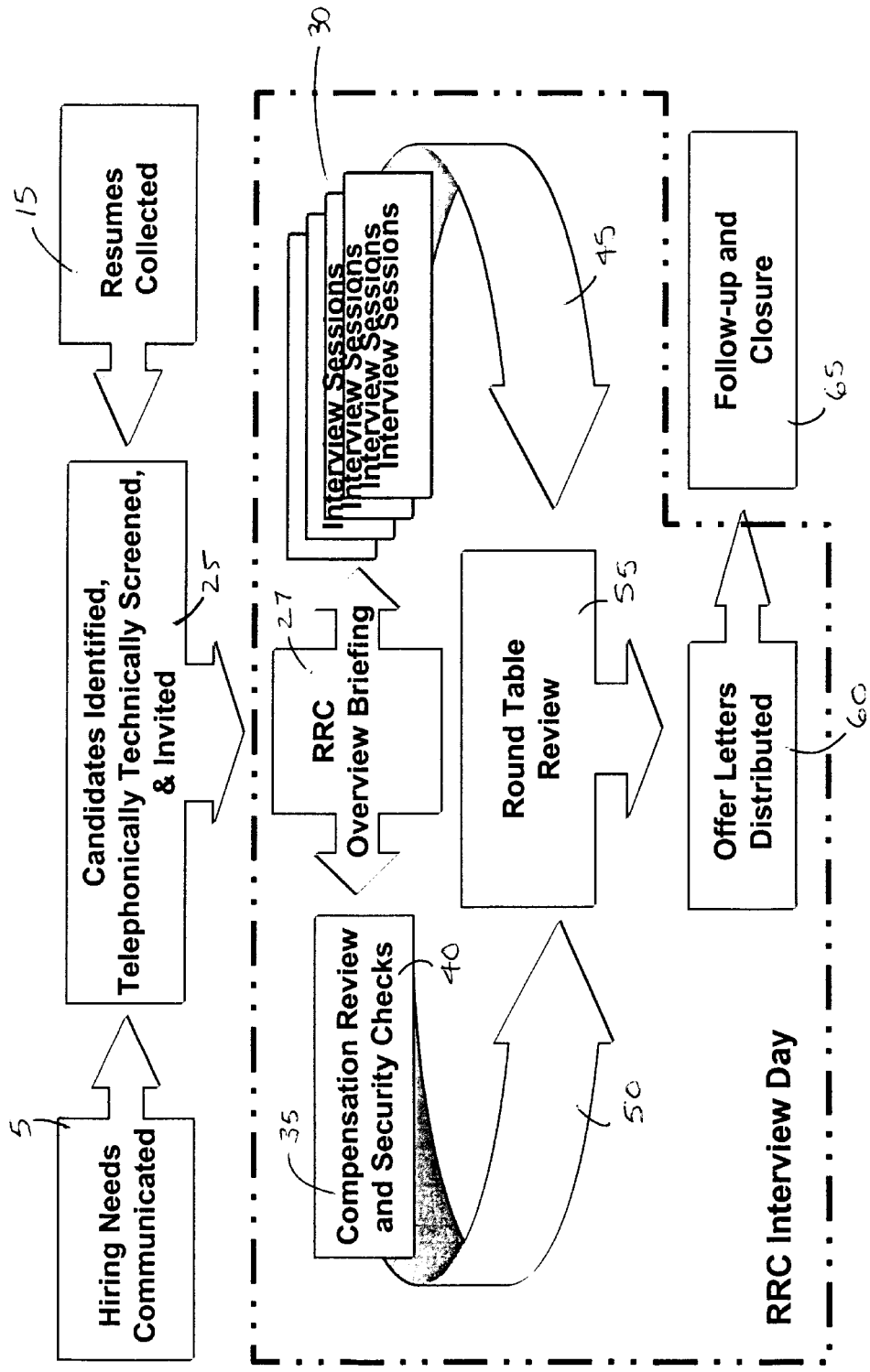
FIG. 2 illustrates a more detailed overview of the method according to the present invention.

Referring now also to FIG. 2, therein is illustrated a more detailed diagram according to the present invention. First, hiring needs 1 are communicated to the RRC 5. Resumes of potential candidates 15 are collected by the RRC S. Candidates 20 are then identified from the collected resumes 15 and are provisionally associated with at least one of the hiring needs 1 communicated. These candidates 20 are telephonically screened and are invited 25 to attend an RRC interview day.

On the RRC interview day to which the candidates were invited, they are preferably first briefed 27 regarding the RRC process and informed as to what they can expect. The candidates are then individually interviewed 30 while compensation reviews 35 and security checks 40 are conducted. Feedback 45 from the interview sessions 30 and 50 from the compensation reviews 35 and security checks 40 are used in a roundtable review 55 of each of the interviewed candidates which leads to consolidated offer letters being distributed 60. Finally, candidate follow ups 65 are conducted by the RRC of each candidate.

Figure 3:
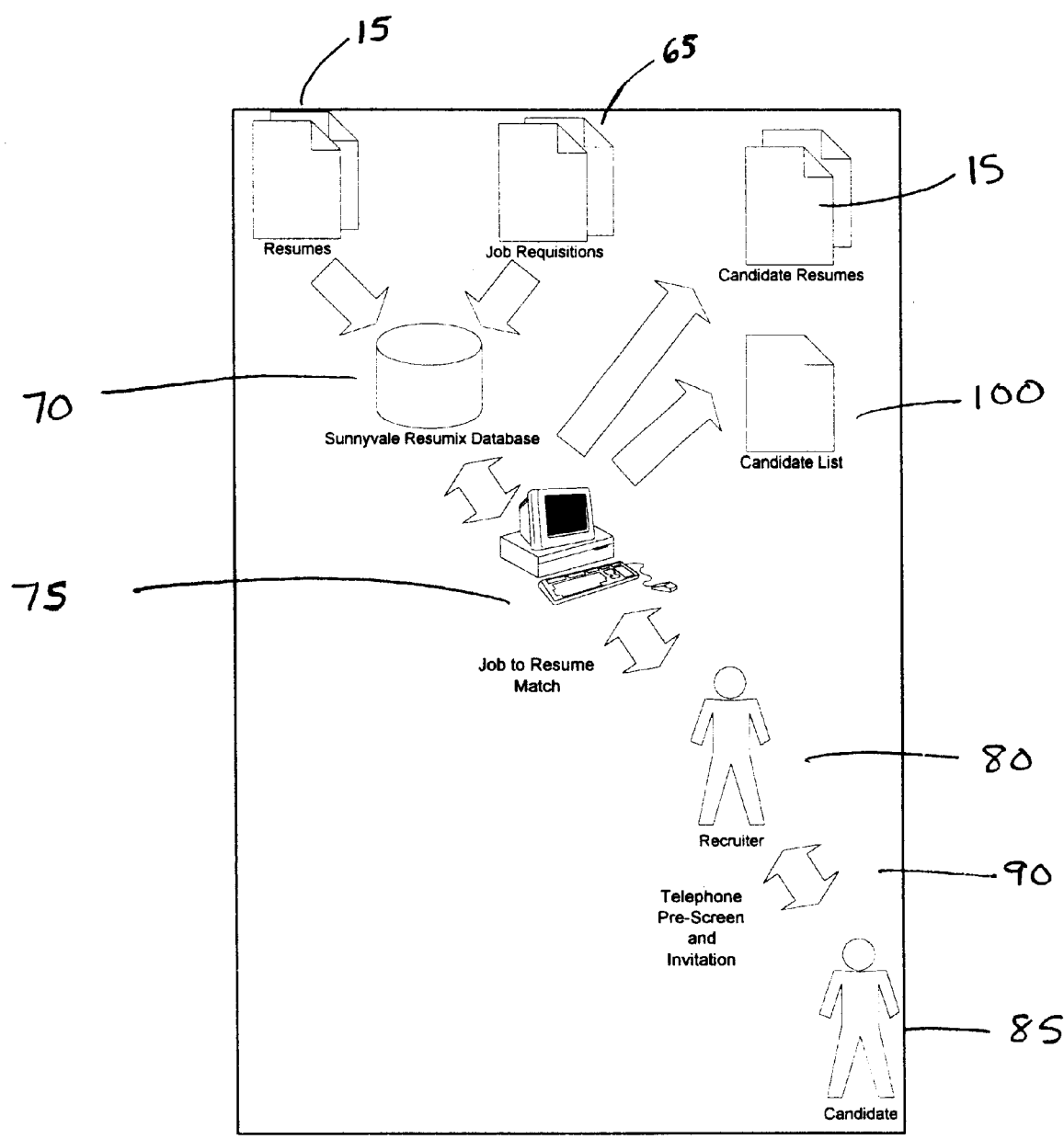
FIG. 3 illustrates a preferred embodiment of candidate identification steps according to the present invention.

Referring now to a particularly preferred embodiment of the present invention, FIG. 3 illustrates the preferred steps of candidate identification. Prior to a RRC interview day, preparation activities are required. During the Interview Day Preparation phase, candidates are identified, Electronic Candidate Folders are created, an on-line review of candidate resumes is performed and candidate education occurs as described in the sections following.

Upon receiving job requirements from the Participating Business Units (divisions for example), Job Requisitions 65 are entered into a database 70 (hereinafter referred to as the Resumix Software System). At the same time, as potential applicant resumes 15 are received, they are scanned and input into the Resumix Software System.

Based on RRC Job Requisitions opened (unfilled for example), the Resumix system performs a search 75 against open requisitions 65 and resumes 15 to identify applicants that meet job requisition requirements. Upon matching an applicant to job requisition, an RRC Recruiter 80 telephones the identified applicant 85 and conducts a telephone screen 90 to determine if the skills and experience of the applicant matches the resume 15 received. Upon passing the telephone screen 90 the applicant 85 is invited to the RRC for an in-house interview. The candidate is scheduled for an interview appointment and given a web site address, user name, and password to access the RRC external web site, and instructions on the web site applications required to be downloaded and filled out prior to arriving at the RRC.

The RRC Recruiter 80 sends a soft copy of the applicant resume 15 via electronic mail from the Resumix Software System to a RRC Scheduler 95. In addition, a list of applicant names 100 that have been invited to interview are sent via electronic mail to the RRC Scheduler 95, for use in preparing Interview Day Electronic Candidate Folders 110.

Figure 4:
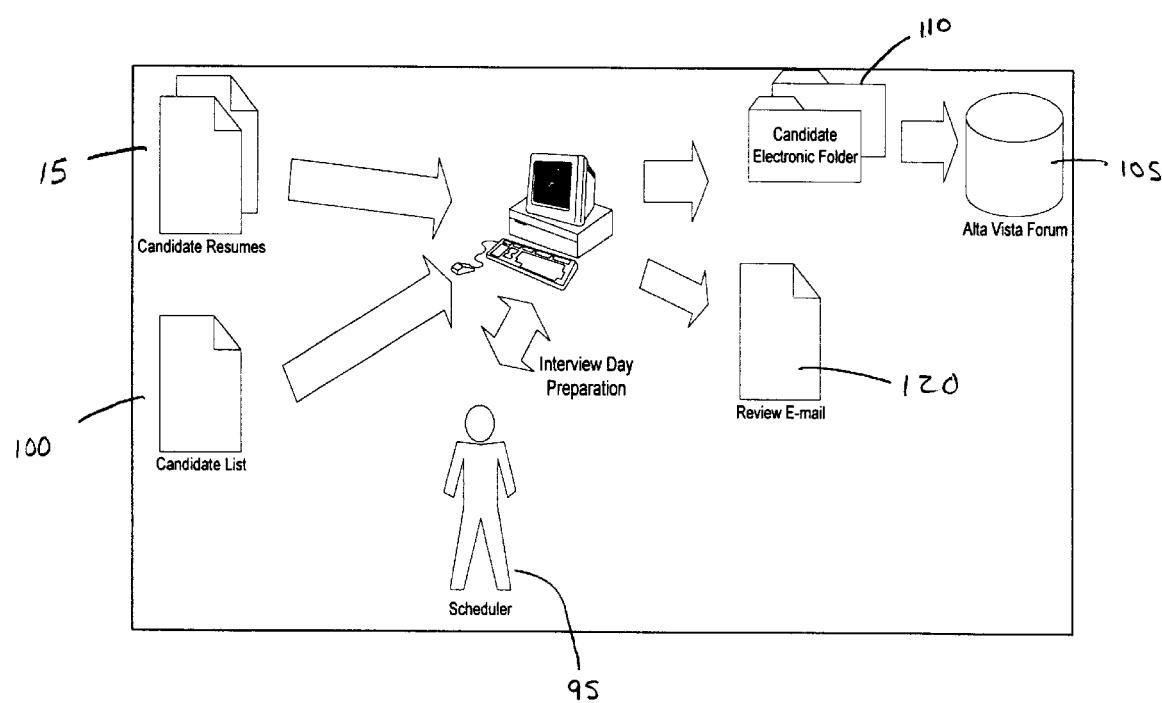
FIG. 4 illustrates a preferred embodiment of electronic candidate folder preparation steps according to the present invention.

Referring now also to FIG. 4, upon receiving the names of invited candidates 100 and soft copy resumes 15 for each candidate, the RRC Scheduler 95 prepares for the interview day. Accessing the RRC Alta Vista Forum 105, for example by using a commercial off the shelf software package available such as a web browser, the RRC Scheduler 95 creates an electronic folder 110 for the Interview Day for each candidate name. Each candidate folder 110 is populated with the associated candidate resume 15.

Figure 5:
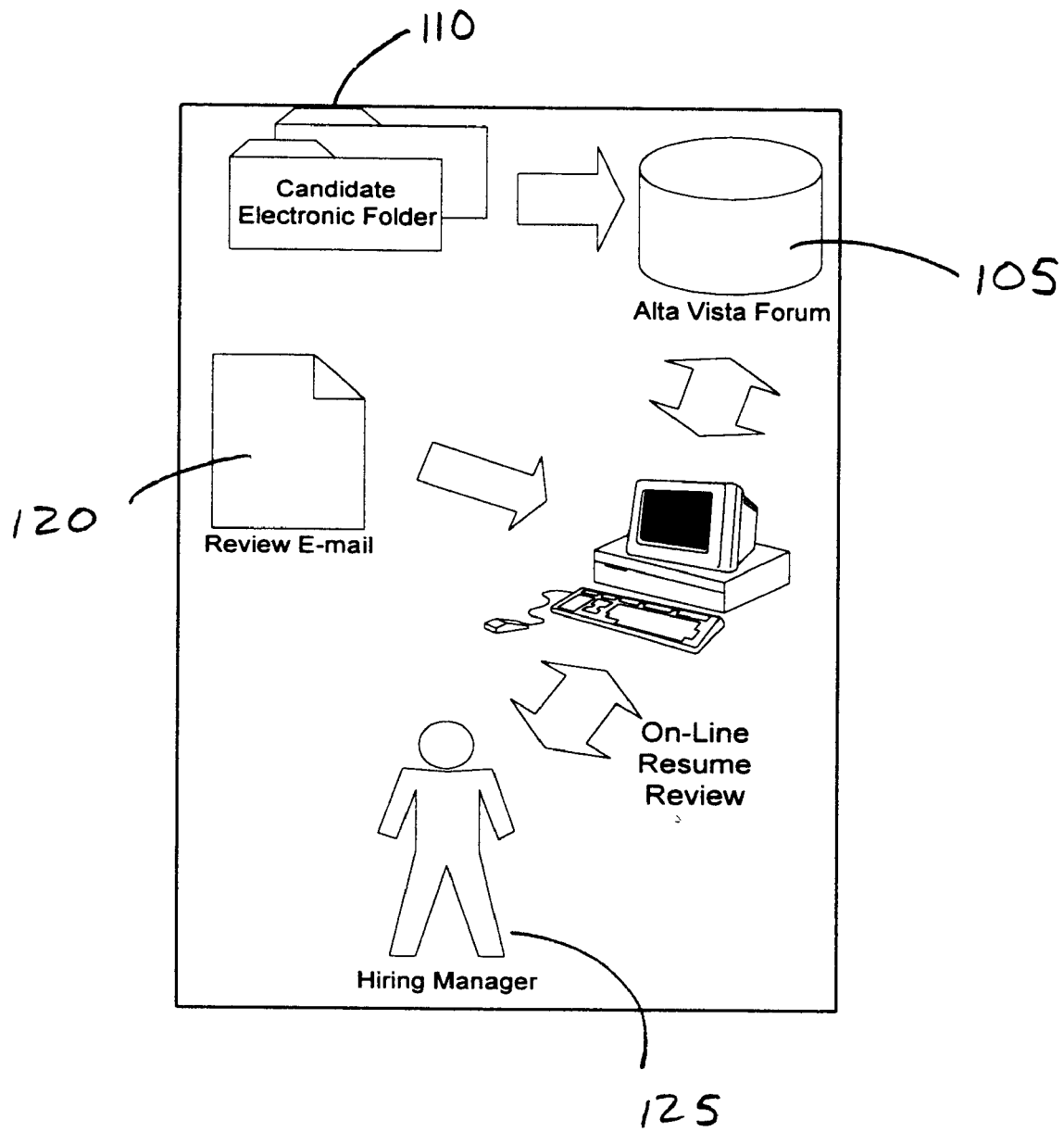
FIG. 5 illustrates a preferred embodiment of resume reviewing steps according to the present invention.

Referring now also to FIG. 5, upon completion of the electronic candidate folder 110 preparation, an electronic mail message 120 is sent to the Business Unit Hiring Managers 125, informing each manager 125 of the availability of candidate resumes 15 for review prior to arriving to the RRC for interviews.

Upon receiving an electronic mail notification 120 that resumes 15 are available on-line for review, Business Unit Hiring Managers 125 preferably review candidate resumes 15 prior to the interview day. Resumes 15 are accessed using the RRC Alta Vista Forum 105 via a web browser. Preferably, hiring managers 125 select resumes 15 for review using two different methods. The first access method is through a selection of the Interview Day folder and subsequently through each Candidate Electronic Folder 110. The second method is through the use of a Search Engine to select candidate resumes using key word and date parameters.

Figure 6:
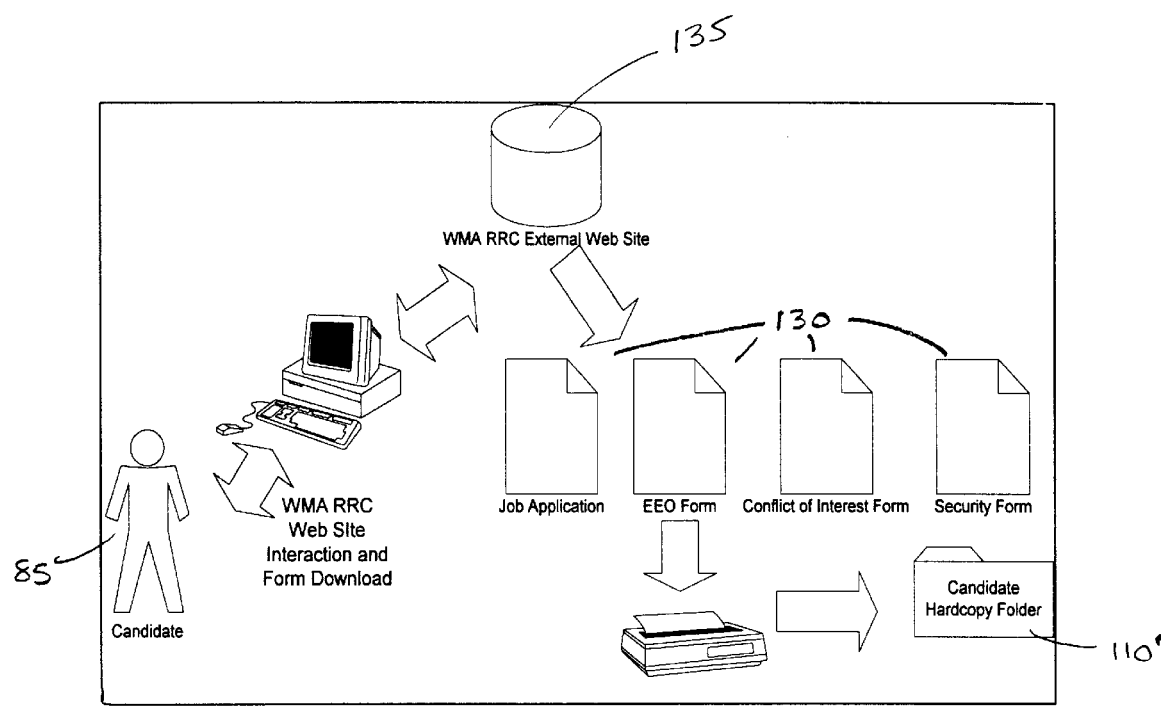
FIG. 6 illustrates a preferred embodiment of interview day preparation steps according to the present invention.

Referring now also to FIG. 6, after receiving an invitation to interview at the RRC, each candidate 85 is required to call and schedule an appointment and to fill out employment forms 130 prior to the interview day. Each candidate 85 is provided a web site address and corresponding name and password to access the RRC external web site 135.

The RRC external web site 135 preferably serves as a vehicle to communicate the following information:

Information on the participating business units

Information about living and working in the business unit's geographical area

Information on preparing for a successful interview

Employment forms to download and fill out prior to arrival

Directions to the RRC

Visit preparation instructions.

Upon accessing to the RRC Web Site 135, each candidate 85 downloads and preferably fills out the following employment forms 130:

Job Application

EEO Form

Conflict of Interest Form

Security Form.

All forms 130 are preferably collected upon each candidate's 85 arrival to the RRC, but could also be electronically transferable to the RRC for example utilizing the website 135.

Figure 7:
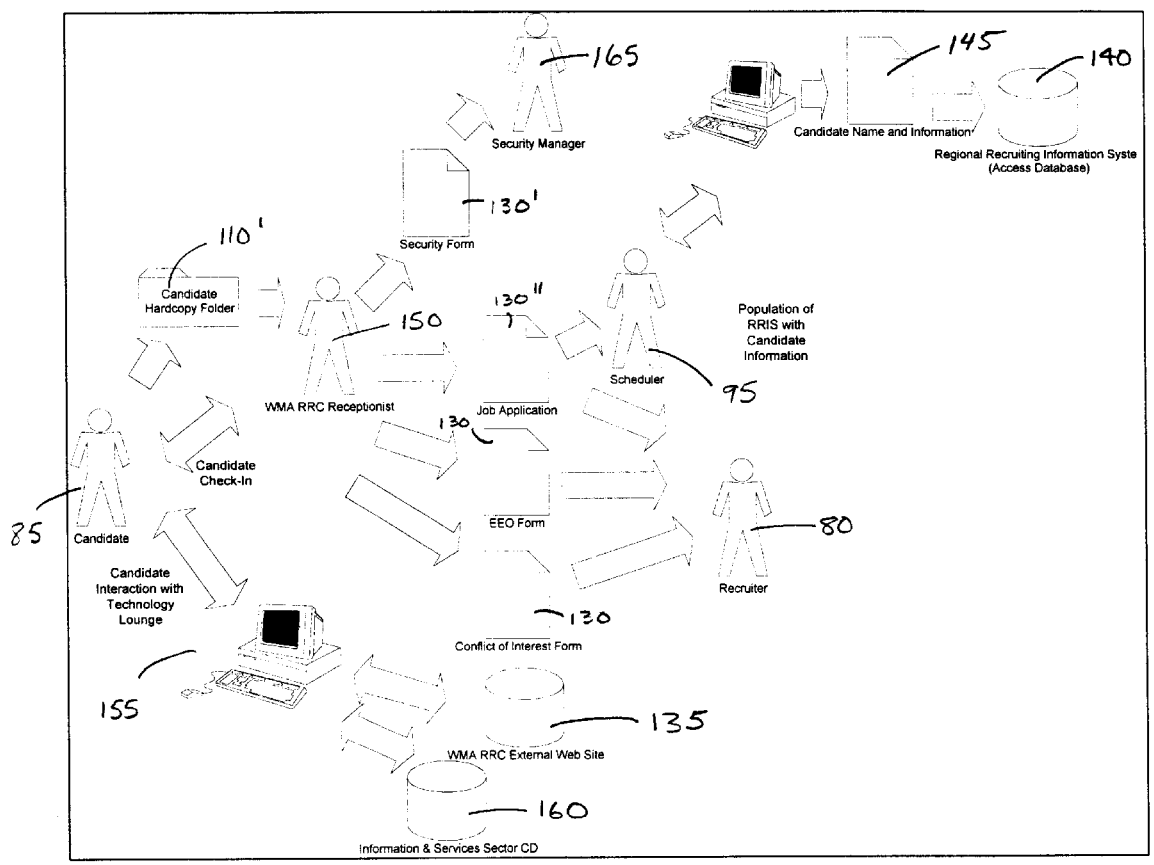
FIG. 7 illustrates a preferred embodiment of interview day steps according to the present invention.

Referring now also to FIG. 7, at the same time of the general briefing 27, the RRC Scheduler 85 begins to populate the Regional Recruiting Information System (RRIS) 140, an access database which houses the results of the interview day, with Candidate information 145 derived from the interviews, resume, phone interview, forms 130. Candidate Information 145 that is captured in the RRIS 140 preferably includes:

Candidate Name

Candidate Title

Candidate E-mail Address

Candidate Work Phone Number

Candidate Home Phone Number

Candidate Fax Number

Candidate Address

Candidate City

Candidate State

Candidate Zip Code

Candidate Social Security Number

Candidate Ethnicity (Maintained in restricted files; entered if self identified)

Candidate Gender (Maintained in restricted files)

Candidate Comments.

During a RRC Interview Day three main activities are performed by RRC Personnel. These activities include Candidate Check-In, Interview Sessions, and an end of interview day Offer decision meeting as described in the following sections.

Upon arriving at the RRC, each candidate 85 is preferably welcomed by the RRC Receptionist 150. The RRC Receptionist 150 collects the employment application forms 130 from each candidate 85 and then preferably escorts each candidate 85 to the technology lounge 155.

The technology lounge 155 provides a waiting area as candidates 85 wait for the Interview Sessions to begin. It provides a desktop area (preferably including kiosks 245) where each candidate 85 can access the external RRC web site 135 to continue to conduct research and where each candidate 85 can interact with business entity softcopy information materials. The I&S Sector Information Program 160 provides insight into I&S Sector Businesses, which participate in the RRC, and the products that are developed within the Information and Services Sector.

Upon receiving a hardcopy of each candidate folder 110', the RRC Receptionist 150 provides the form package 130, with the exception of the Security Form 130', to the compensation analyst 185, and the Security Form 130' to the Security Manager 165. At the beginning of each interview session, each candidate 85 is escorted into a large conference room and attends a general briefing. The general briefing 27 provides information on the hiring business entity, and educates the candidate 85 on the RRC and what to expect during the Interview Day.

Figure 8:
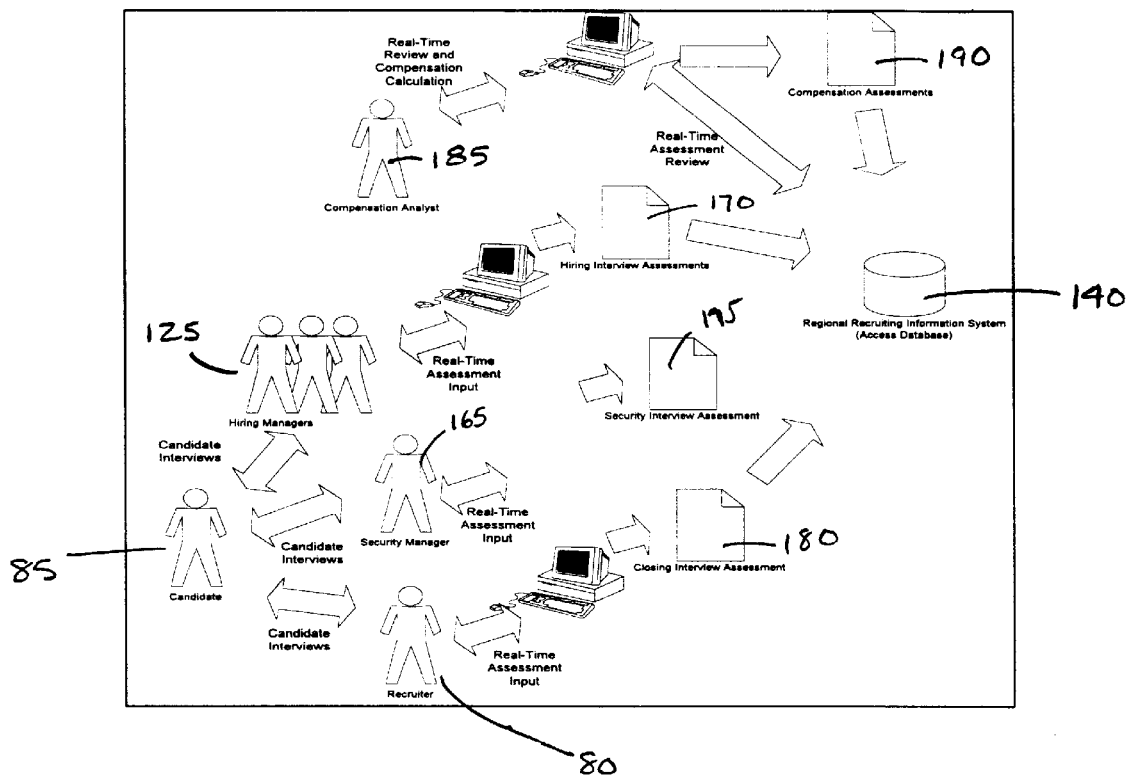
FIG. 8 illustrates a preferred embodiment of interview session steps according to the present invention.

Referring now also to FIG. 8, upon completion of the general briefing session 27, each candidate 85 is escorted back into the Technology Lounge 155 and awaits his first interview. The RRC Hiring Managers 125 and RRC Security Manager 165 introduce themselves to each candidate 85 in the technology lounge 155 and proceed to individually escort each candidate 85 to a designated Interview Room. Each candidate is interviewed and upon completion is escorted back into the technology lounge 155. Upon completion of each interview, a Hiring Manager 125 returns from escorting the Candidate 85 to the Interview Room and accesses the RRIS database 140. The Manager Information that is captured by the RRIS database 140 preferably includes:

Social Security Number
Business Identifier
Name
Title
E-mail Address
Work Phone Number
Home Phone Number
Mail Point
Fax Number
Comments.

The Manager 125 begins to enter a real-time assessment 170 of each candidate 85 derived at least in part from the interview. Hiring Interview information 170 captured preferably includes:

Hiring Manager Name
Business
Hiring Location, including City and State
Candidate Name
Position Interviewing for
Communication Skills Assessment
Technical Capabilities Assessment
Work Experience Assessment
Degree
Major
Years of Applicable Experience
Hiring Band, if required for business
Resume Accuracy Assessment
Compensation Range Assessment
Hire Status Assessment
Comments.

Upon completion of a Security Interview, a Security Manager 165 returns from escorting a candidate 85 to the technology lounge 155 and completes a Security Interview Assessment 175 form which is kept separate from the RRIS 140. Security Interview information 175 captured preferably includes:

Candidate Name
Candidate Potential Clearance Level
Current Clearance Level
Current Clearance Status
Comments
Security Evaluation
Security Manager Name.

Candidate 85 continues to interview based on a preset schedule for the Interview Day. At the end of the Hiring Manager 125 and Security Manager 165 interview set, each Candidate 85 meets with a recruiter 80. The Recruiter 80 escorts each candidate 85 to an interview room and conducts a closing interview. Upon completion of the Closing Interview, each candidate 85 is preferably thanked for his time and completes the interview day. The Recruiter 80, upon escorting the Candidate 85 back to the Receptionist 150 returns to the interview room and accesses the RRIS 140 to enter a closing interview assessment 180. Closing Interview Assessment information 180 captured preferably includes:

Recruiter Name
Candidate Name
Current Salary (if applicable)
Last Increase (percentage, if applicable)
Last Increase Amount (dollars, if applicable)
Time of Next Review (if applicable)
Minimum Salary Requirements
Location Preference/Business Name
What it will take for the candidate to work for Business entity
Additional comments.

During the Interview Session, an RRC Compensation Analyst 185 accesses the RRIS database 140 and reviews interview assessment data 170 for each candidate 85. Based on the assessment data 170, the Compensation Analyst 185 determines a price point to offer to each candidate 85 and enters the Compensation Analyst assessment 190 into the RRIS database 140. The Compensation Analyst Assessment 190 preferably includes:

Compensation Analyst Name
Compensation Offer
Comments.

Figure 9:
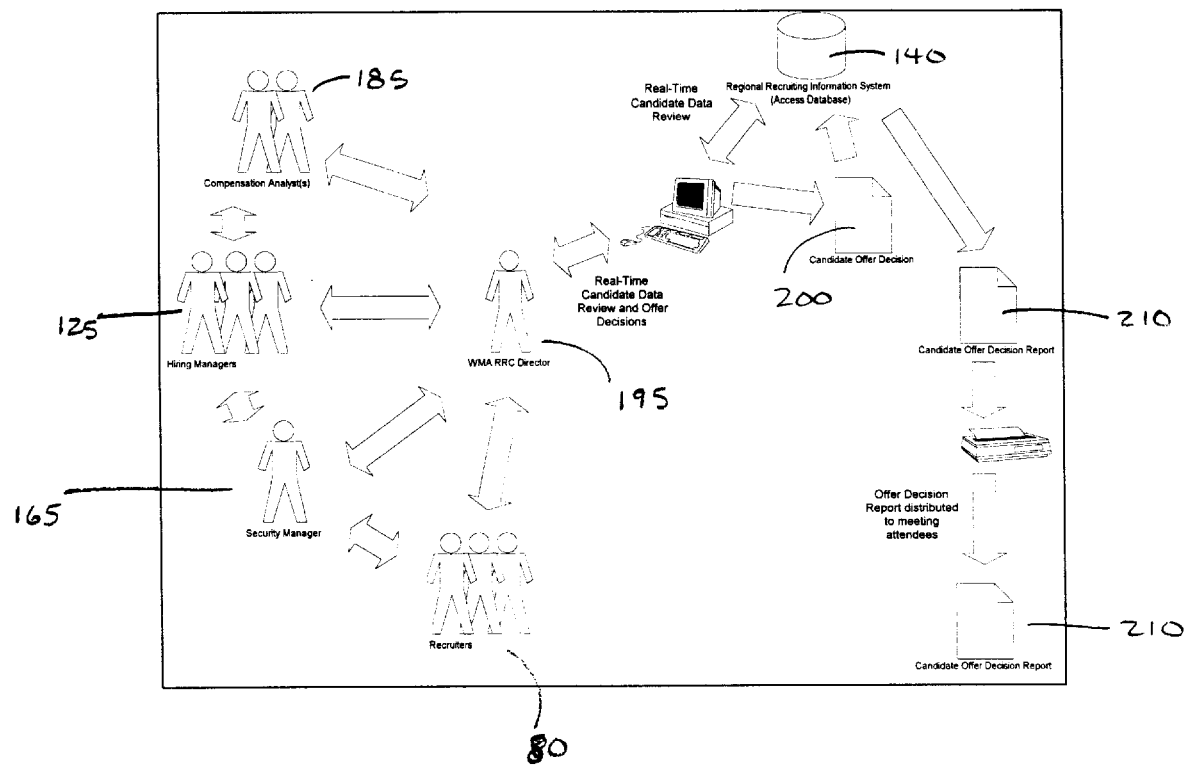
FIG. 9 illustrates a preferred embodiment of offer decision steps according to the present invention.

Referring now also to FIG. 9, upon completion of all Interviews for the interview day, all personnel who have been active in the interview day (80, 125, 165, 185) meet to discuss candidate offers for select candidates 85. Preferably, a director 195 of the RRC acts as the facilitator of the offer decision meeting.

During the offer decision meeting, at the end of the interview day, the RRC Director 195 facilitates a review of each candidate 85 that attended the interview day. Each candidate's Interview Assessment Data (170, 175, 180 and 190) are reviewed and an offer, including price, and companies offering a position are determined. The RRIS database 140 is preferably projected from a desktop platform onto a large conference screen for the Director's 195 use in facilitating the session for example. Final offer decision information 200 is captured in the RRIS database 140 upon agreement for each candidate 85. Offer Decision information 200 captured preferably includes:

Business
Hire Decision
Hiring Manager
Compensation Offer
Sign-On Bonuses
Decision Comments.

Any candidate 85 not receiving an offer is reflected as rejected in the database 140. Candidates 85 are preferably defined with the following Hiring Statuses:

No Hire
Hire for Business entity
Potential Hire for Future
Hire for other hiring need of Business Entity.

Figure 10:
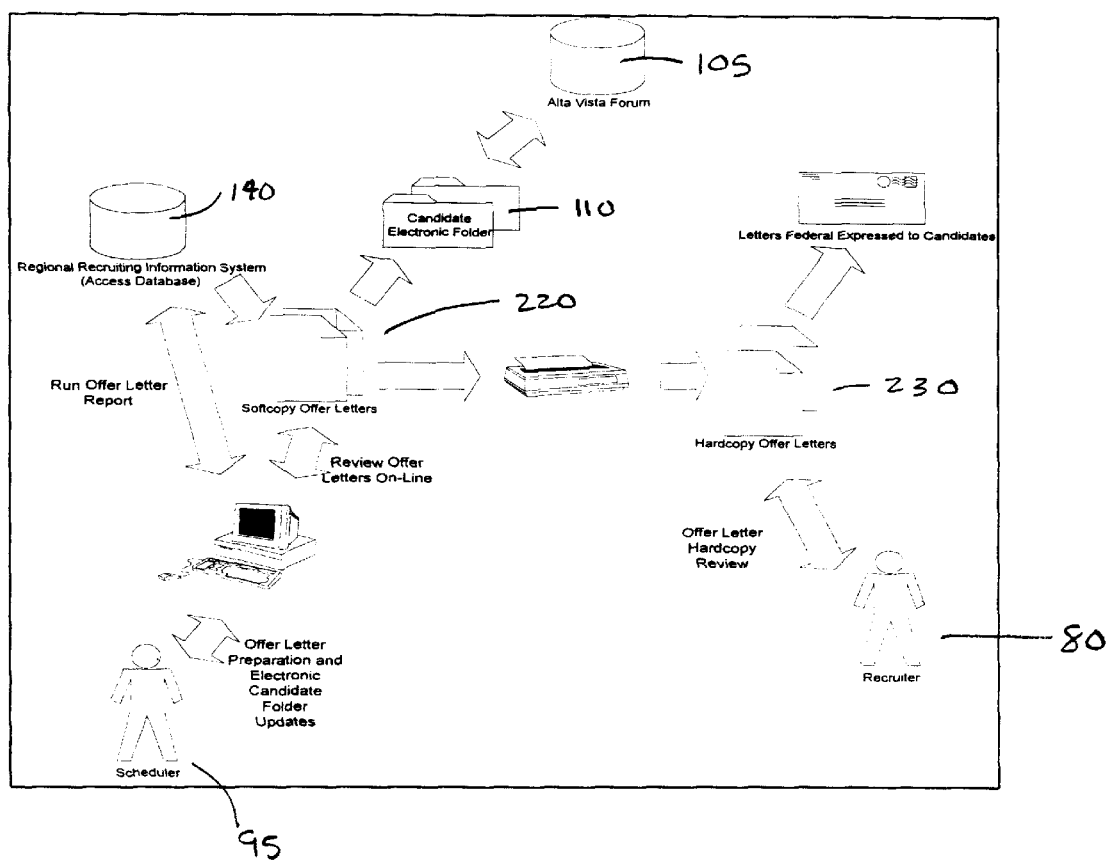
FIG. 10 illustrates a preferred embodiment of offer letter preparation steps according to the present invention.

Upon completion of the Offer Decision Meeting, a Candidate Offer Decision Report 210 is preferably cycled and printed from the database 140. Referring now also to FIG. 10, after the Interview Day Decision Offer Meeting, a series of Post-Interview activities are performed. These activities include Offer Letter Preparation and Applicant Tracking Updates as described in the following sections.

Upon completion of an Interview Day, the RRC Scheduler 95 accesses the RRIS database 140 and runs the automated Offer Letter and Thank You Letter Reports 220. Each candidate 85 who has not received an Offer Letter 220 is sent a thank You Letter 220. The Offer Letters 220 and Thank You Letters 220 are exported from the RRIS database 140 into a Rich Text Format file for example. Using Microsoft Word or any other suitable means, the Scheduler 95 reviews and concatenates the Offer Letters 220 down to one Offer Letter 230 per candidate using the Offer Letter Decision Report to ensure that all Offers are reflected in each letter 230. In addition, the Thank You Letters 220 are reviewed in soft copy format prior to printing hard copy versions 230.

Upon completion of the Offer Letter and Thank You Letter soft copy preparation 220, the letters are printed (230) and provided to the assigned RRC Recruiter 80 for final review, and approval. Upon receiving the approval, including the Recruiter 80 signature, each letter 230 is sent to the respective candidate 85, preferably by Federal Express for example.

Figure 11:
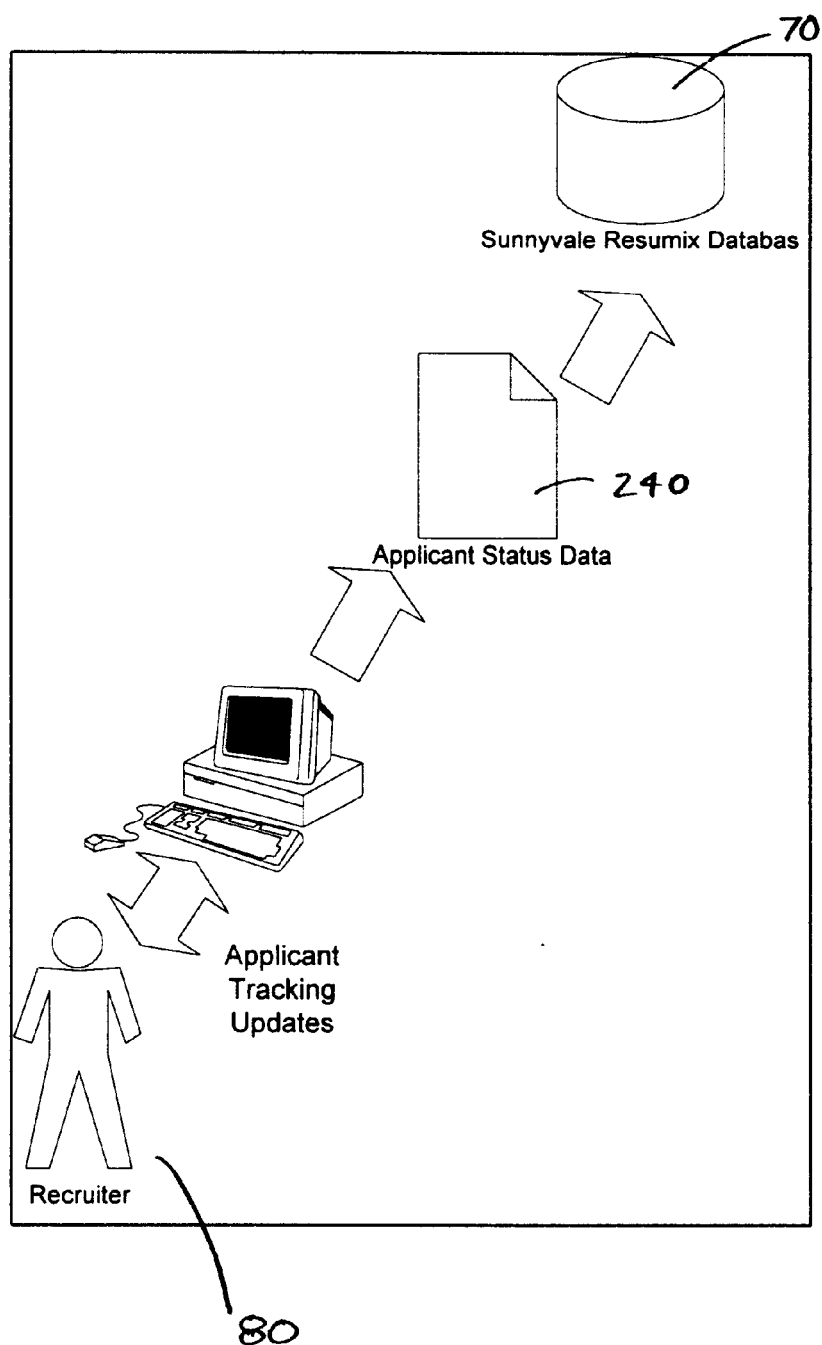
FIG. 11 illustrates a preferred embodiment of applicant tracking steps according to the present invention.

Referring now also to FIG. 11, along with reviewing and approving the Offer or Thank You Letter 230, each Recruiter 80 preferably logs into the Resumix Software System 70 and updates the Applicant "Disposition" and "Offer" Statuses 240 for each candidate 85 that has interviewed for an LMC position. If a Candidate 85 has not been extended an offer, the Disposition statuses 240 preferably reflect the reasons for the decision.

If an offer is extended, upon receipt of a candidate's 85 response, the candidate's decision data is entered into an "Accept" or "Reject" status fields within the Applicant status 240, in addition to the candidate's "Hire Date" if applicable.

Figure 12:
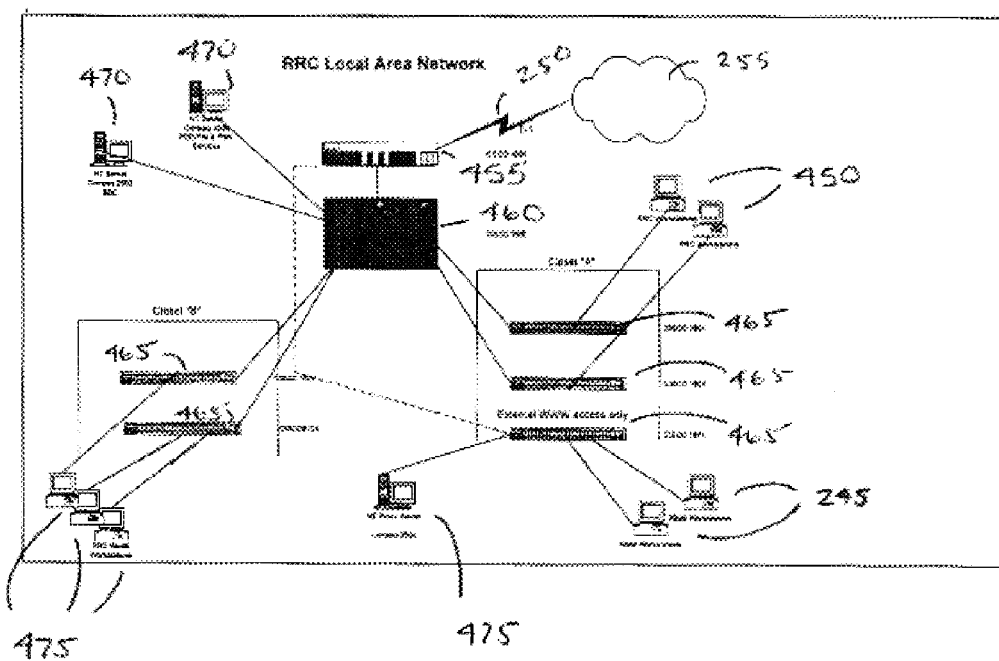
FIG. 12 illustrates a preferred embodiment of network interconnection utilized by the present invention.

Referring now also to FIG. 12, preferably the technical center includes multiple kiosks, each of which preferably include a Pentium II computer, a mouse, a keyboard, a flat panel display, an Internet browser such as Netscape Communicator, other Internet software such as NetNanny, and productivity software such as Microsoft Office or the like (collectively designated as 245).

Preferably, each interview room includes a Pentium computer for example, a mouse, keyboard, monitor, Internet browser such as Netscape Communicator, virus protection software, and other software such as Adobe Acrobat and Microsoft Office for example (collectively designated 450). Additionally, each interview room computer preferably includes a QWS3270 TN 3270 emulator for communicating with existing hardware (mainframe) and for accessing the database 140 for example. Preferably, the server/router/switch/hub configuration to implement the present invention includes a Cisco 4500 Router 455, Cisco 5000 Switch 460, Cisco 1924 Hubs 465, and a Compaq 2500 Fileserver with NT Server w/service pack 470 for example. Also, a connection 250 to the entity's existing network 255 is provided. Preferably the Kiosk Internet Proxy Server 475 includes a Compaq 2500 Fileserver with NT Server w/service pack, and Netscape Proxy Server and server to insulate the kiosks 245. Preferably each manager 125 is equipped with a Pentium II laptop, mouse, keyboard, docking station, display, modem, Ethernet adapter, an Internet browser such as Netscape Communicator, virus protection software such as McAfee Antivirus and other software such as Adobe Acrobat Reader and Microsoft Office Professional (collectively designated 475). Preferably each managers 125 laptop further includes a QWS3270 TN3270 emulator.

Figure 13:
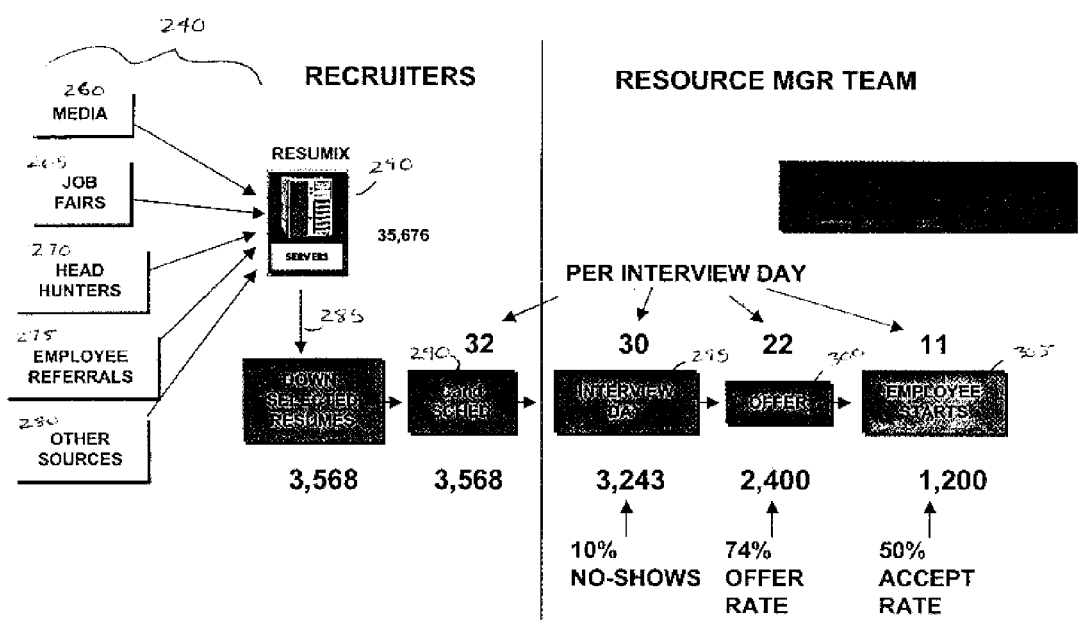
FIG. 13 illustrates estimated scaled up results obtainable utilizing the present invention.

Referring now to FIG. 13, estimated scaled-up results from a pilot program consistent with the present invention are therein illustrated. As illustrated therein, resumes 15 were collected 240 using sources such as media 260, job fairs 265, head hunters 270, employee referrals 275 and other sources 280 and fed into the Resumix server 290. These resumes 15 were then down selected 285 and phone interviews led to candidate scheduling 290. Interviews were conducted 295, offers were extended 300 and employees started working 305. Estimating 35,676 resumes to be received each year, approximately 10% or 3,568 would be down selected and scheduled for an interview assuming 109 interview days per year. Of these 3,568 candidates 10% are estimated as not to show resulting in 3,243 interviews being constructed each year. Of these 3,243 candidates being interviewed approximately 74% or 2,400 are estimated to be offered jobs, 50% of those offered jobs or 1,200 are estimated to accept the offer.

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A computer method for recruiting personnel for a business entity including a plurality of distinct business units each having individual hiring requirements, wherein at least some of said distinct business units' hiring requirements compete for common applicants, said method comprising the steps of:

determining a plurality of hiring needs associated with a business entity including a plurality of distinct business units each having individual hiring requirements;

entering information related to a plurality of hiring needs, each of said plurality of hiring needs being respectively associated with one of said plurality of distinct business units, and information related to a plurality of candidates into a database, respectively;

automatically cross-referencing said information related to said plurality of hiring needs with said information related to said plurality of candidates to identify candidates selected from said plurality of candidates who satisfy entered information indicative of hiring needs; and, determining whether one of said identified candidates should be offered a job or more than one job associated with said hiring needs;

wherein, when it is determined that one of said identified candidates should be offered more than one job as determined by said hiring needs, all jobs pertinent to said one of said identified candidates are offered substantially simultaneously to said one of said identified candidates for employment within said business entity including a plurality of distinct business units.

2. The method of claim 1, wherein said step of determining which of said identified candidates should be offered a job further comprises interviewing said identified candidates with an individual associated with a common recruiter means, respectively, wherein said common recruiter means integrates hiring functions common to each of said plurality of business units.

3. The method of claim 2, wherein said step of determining which of said identified candidates should be offered a job further comprises interviewing said identified candidates with at least one individual respectively associated with one of said plurality of business units.

4. The method of claim 3, wherein said step of determining which of said identified candidates should be offered a job further comprises reviewing a compensation history and security information associated with each of said identified candidates substantially contemporaneously with said step of respectively interviewing said identified candidates with at least one individual respectively associated with one of said plurality of business units.

5. The method of claim 4, further comprising the steps of:
generating electronic folders, each being respectively associated with one of said identified candidates;
respectively entering said information related to each identified candidate into each electronic folder; and,
respectively entering said information relating to said compensation history and said security information into said database.

6. The method of claim 5, further comprising the step of posting said electronic folders to a forum accessible by said at least one individual respectively associated with one of said plurality of business units.

7. The method of claim 3, further comprising the step of electronically disseminating said information associated with said identified candidates to said at least one individual respectively associated with one of said plurality of business units prior to said step of determining which of said identified candidates should be offered a job associated with said hiring needs.

8. The method of claim 1, wherein said step of determining which of said identified candidates should be offered a job associated with said hiring needs further comprises the step of inviting those identified candidates possessing similar skills to interview on a select day.

9. The method of claim 1, wherein said step of offering all jobs pertinent to said one of said associated candidates to said one of said identified candidates is performed automatically and said method further comprises the step of making available to said identified candidates, using a computer network, information selected from the group of: information relating said business entity and at least one business unit, information related to living and working in the business unit's geographical area, information on preparing for success, employment forms, directions, and visit preparation instructions.

10. A recruiting system for a business entity including a plurality of distinct business units each having individual hiring requirements, wherein at least some of said distinct business units' hiring requirements compete for common applicants, said system comprising:
identifying means for determining a plurality of hiring needs associated with a business entity including a plurality of distinct business units each having individual hiring requirements;
common recruiter means for integrating hiring functions common to each of said plurality of business units and comprising a computer network including at least one database and a plurality of terminals; data entry means for entering information related to a plurality of hiring needs, each of said plurality of hiring needs being respectively associated with one of said plurality of distinct business units, and information related to a plurality of candidates into said database utilizing said plurality of terminals, respectively;
search means for automatically searching said database to cross-reference said information related to said plurality of hiring needs with said information related to said plurality of candidates to identify candidates selected from said plurality of candidates who satisfy entered information indicative of said hiring needs;
hiring means for determining whether one of said identified candidates should be offered a job or more than one job associated with said hiring needs; and,
concatenation means for, when it is determined that one of said identified candidates should be offered more than one job as determined by said hiring means, combining all jobs pertinent to said one of said identified candidates into a single offer of employment within said business entity including a plurality of distinct business units.

11. The system of claim 10, wherein said hiring means includes means for enabling at least one individual respectively associated with one of said plurality of business units to interview said identified applicants.

12. The system of claim 11, wherein said common recruiter means includes verification means for interviewing said identified applicants to determine whether they possess skills associated with said hiring needs.

13. The system of claim 11, further comprising means for reviewing a compensation history and security information associated with each of said identified candidates substantially contemporaneously with said interviewing said identified candidates with at least one individual respectively associated with one of said plurality of business units.

14. The system of claim 13, further comprising means for:
generating electronic folders, each being respectively associated with one of said identified candidates;
respectively entering said information related to each identified candidate into each electronic folder; and, respectively entering said information relating to said compensation history and said security information into said database.

15. The system of claim 14, further comprising means for posting said electronic folders to a forum accessible through a computer network by said at least one individual respectively associated with one of said plurality of business units.

16. The system of claim 14, further comprising means for electronically disseminating said electronic folders to said at least one individual respectively associated with one of said plurality of business units prior to determining which of said identified candidates should be offered a job associated with said hiring needs.

17. The system of claim 10, further comprising means for grouping said identified candidates having similar skills into skill groups, wherein each skill group is invited to interview on a select day.

18. The system of claim 1, wherein said hiring means further comprises means for automatically offering all jobs pertinent to said one of said associated candidates to said one of said identified candidates, and said system further comprises means for making available to said identified candidates, using a computer network, information selected from the group of: information relating said business entity and at least one business unit, information related to living and working in the business unit's geographical area, information on preparing for a successful interview, employment forms, directions, and visit preparation instructions.

19. A computer method for recruiting a candidate for a business entity including a plurality of distinct business units each having individual hiring requirements, wherein said candidate meets the hiring requirements of at least two of said distinct business units, said method comprising the steps of:

determining a plurality of hiring needs associated with a business entity including a plurality of distinct business units each having individual hiring requirements;

entering information related to a plurality of hiring needs, each of said plurality of hiring needs being respectively associated with one of said plurality of distinct business units, and information related to a plurality of candidates into a database, respectively;

automatically cross-referencing said information related to said plurality of hiring needs with said information related to said plurality of candidates to identify a select candidate, selected from said plurality of candidates, who satisfies entered information indicative of at least two distinct hiring needs selected from said plurality of hiring needs; and, substantially simultaneously determining whether said select candidate should be offered a first job associated with a first of said at least two hiring needs and a second job associated with a second of said at least two hiring needs; and, if so, offering said first and second jobs to said select candidate substantially simultaneously for employment within said business entity including a plurality of distinct business units.

20. The method of claim 19, wherein said first job is associated with a first business unit selected from said plurality of business units and said second job is associated with a second business unit selected from said plurality of business units, and said step of offering said first and second jobs td said select candidate substantially simultaneously is performed automatically.

\* \* \* \* \*